(12) United States Patent
Leonardi et al.

(10) Patent No.: US 8,678,052 B2
(45) Date of Patent: Mar. 25, 2014

(54) WOOD CHIP COLLECTION SYSTEM

(75) Inventors: Joseph A. Leonardi, Auburn, NY (US); Bruce C. Jordan, Auburn, NY (US)

(73) Assignee: Leonardi Manufacturing Co., Weedsport, NY (US)

( * ) Notice: Subject to any disclaimer, the term of this patent is extended or adjusted under 35 U.S.C. 154(b) by 885 days.

(21) Appl. No.: 12/172,664

(22) Filed: Jul. 14, 2008

(65) Prior Publication Data
US 2009/0014567 A1 Jan. 15, 2009

Related U.S. Application Data

(60) Provisional application No. 60/949,832, filed on Jul. 13, 2007.

(51) Int. Cl.
*A01G 23/06* (2006.01)
*B27M 3/00* (2006.01)

(52) U.S. Cl.
USPC ...... 144/24.12; 144/334; 241/92; 241/101.73

(58) Field of Classification Search
USPC ............. 144/4.1, 24.12, 24.13, 21, 34.1, 334, 144/337; 241/92, 176
See application file for complete search history.

(56) References Cited

U.S. PATENT DOCUMENTS

| | | | | |
|---|---|---|---|---|
| 2,947,571 A | * | 8/1960 | Hagen | 298/10 |
| 3,394,744 A | * | 7/1968 | Vit | 144/337 |
| 3,533,458 A | * | 10/1970 | McColl | 144/337 |
| 3,552,463 A | * | 1/1971 | Witt | 241/222 |
| 3,576,203 A | * | 4/1971 | Cote | 144/4.1 |
| 3,651,845 A | * | 3/1972 | Propst | 144/4.1 |
| 3,868,980 A | | 3/1975 | Blüm | |
| 4,014,373 A | * | 3/1977 | Smith | 144/4.1 |
| 4,044,525 A | * | 8/1977 | Forsgren | 53/435 |
| 4,062,498 A | * | 12/1977 | Szepaniak | 241/101.76 |
| 4,121,777 A | | 10/1978 | Kolstad et al. | |
| 4,236,554 A | * | 12/1980 | Nicholson | 144/34.1 |
| 4,338,985 A | * | 7/1982 | Smith et al. | 144/34.1 |
| 4,355,670 A | * | 10/1982 | Ohrberg et al. | 144/34.1 |

(Continued)

FOREIGN PATENT DOCUMENTS

| | | |
|---|---|---|
| KR | 96-8078 B1 | 6/1996 |
| WO | WO9110544 | 7/1991 |
| WO | WO 2006050222 A1 * | 5/2006 |

OTHER PUBLICATIONS

European Supplementary Search Report, EP Application No. 08 78 1793.

*Primary Examiner* — David Walczak
*Assistant Examiner* — Jennifer C Chiang
(74) *Attorney, Agent, or Firm* — George R. McGurie; Bond Schoeneck & King, PLLC

(57) ABSTRACT

A wheeled chassis to which a stump grinding unit is securely attached that includes a chip collector attached to either the stump grinder or the wheeled chassis and positioned adjacent the trailing edge of the stump grinding wheel. The wheeled chassis includes a duct in fluid communication with the chip collector, and a collection bin positioned adjacent the trailing end and in spaced relation below the duct. The wheeled chassis is adapted for hitched connection to a vehicle. A blower can be positioned within the duct to produce a rearwardly directed air flow to assist in the chip movement towards the collection bin. The collection bin can be positioned on the wheeled chassis or on a vehicle to which the wheeled chassis is attached.

7 Claims, 15 Drawing Sheets

(56) References Cited

U.S. PATENT DOCUMENTS

| | | | |
|---|---|---|---|
| 4,412,660 A * | 11/1983 | Morin | 241/101.742 |
| 4,426,830 A * | 1/1984 | Tackett | 56/202 |
| 4,530,385 A | 7/1985 | York | |
| 4,681,145 A | 7/1987 | York | |
| 4,683,924 A * | 8/1987 | Cornelius | 144/4.1 |
| 4,703,786 A * | 11/1987 | Doskocil | 144/24.12 |
| 5,137,219 A * | 8/1992 | Morey | 241/92 |
| 5,457,271 A * | 10/1995 | Aulson | 588/249 |
| 5,788,168 A * | 8/1998 | Gilbert et al. | 241/101.742 |
| 5,845,689 A * | 12/1998 | Egging et al. | 144/334 |
| 6,079,078 A | 6/2000 | Byington | |
| 6,179,232 B1 * | 1/2001 | Schumacher | 241/28 |
| 6,230,770 B1 * | 5/2001 | Spaargaren | 144/334 |
| 6,398,140 B1 * | 6/2002 | Stieh et al. | 241/101.741 |
| 7,000,605 B2 * | 2/2006 | Due | 125/13.01 |
| 7,114,317 B2 * | 10/2006 | Dunning et al. | 56/202 |
| 7,513,449 B2 * | 4/2009 | Gross et al. | 241/261.1 |
| 2003/0127904 A1 * | 7/2003 | Due | 299/18 |

\* cited by examiner

WOOD CHIP COLLECTION SYSTEM

CROSS-REFERENCE TO RELATED APPLICATIONS

This application claims priority to U.S. Provisional Patent Application Ser. No. 60/949,832, filed Jul. 13, 2007.

BACKGROUND OF THE INVENTION

1. Field of the Invention

The present invention relates generally to stump grinder apparatus, and more particularly to systems for collecting the wood chips produced by a stump grinder.

2. Description of the Related Art

Stump grinders are well known in the art. Typically, stump grinders employ a wheel to which a plurality of cutting teeth are mounted about the wheel's periphery. The wheel rotates about its axis by a motor. As the wheel rotates, the teeth impact a stump, chipping away the wood. As the teeth cut the stump into small chips and do so at high rates of speed, the chips generally get thrown and collect in a large pile to the side of or behind the stump grinder. In large stump removal projects, these chip piles can accumulate rapidly and require significant clean up efforts.

BRIEF SUMMARY OF THE INVENTION

It is therefore a principal object and advantage of the present invention to provide a chip collection system for stump grinders.

It is another object and advantage of the present invention to provide a system that utilizes the energy of the chip as it is cut away from the stump to assist in the collection effort.

It is a further object and advantage of the present invention to provide a chip collection system that can be retrofit on existing stump grinding equipment.

In accordance with the foregoing objects and advantages, the present invention provides a wheeled chassis to which a stump grinding unit is securely attached, a chip collector attached to either the stump grinder or the wheeled chassis and positioned adjacent the trailing edge of the stump grinding wheel, a duct in fluid communication with the chip collector, and a collection bin positioned adjacent the trailing end and in spaced relation below the duct. The wheeled chassis is adapted for hitched connection to a vehicle. A blower can be positioned within the duct to produce a rearwardly directed air flow to assist in the chip movement towards the collection bin. The collection bin can be positioned on the wheeled chassis or on a vehicle to which the wheeled chassis is attached.

A specially designed stump grinding wheel that assists in chip movement is also encompassed within the present invention. The stump grinding wheel includes cut out regions around its periphery and a series of curved vanes extending from the sidewalls of the wheel proximate to where teeth would be mounted to the wheel. The vanes will catch the chips as they are cut from a stump and will push them towards the chute, increasing their energy to assist in movement of the chips through the chute and into the collection bin.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
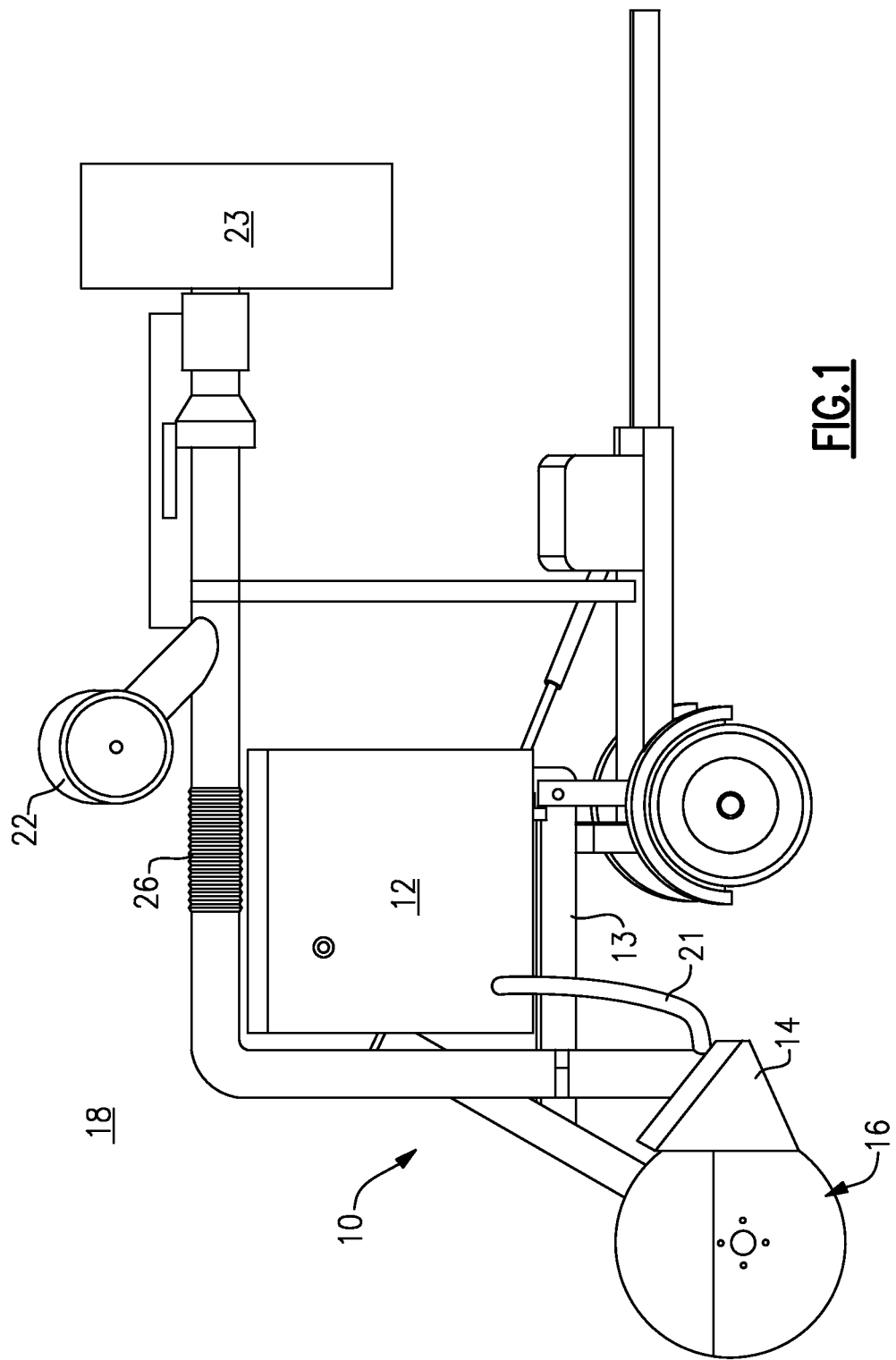
FIG. 1 is a perspective view of a first embodiment of a chip collection system with a flexible coupling in the duct.
Figure 2:
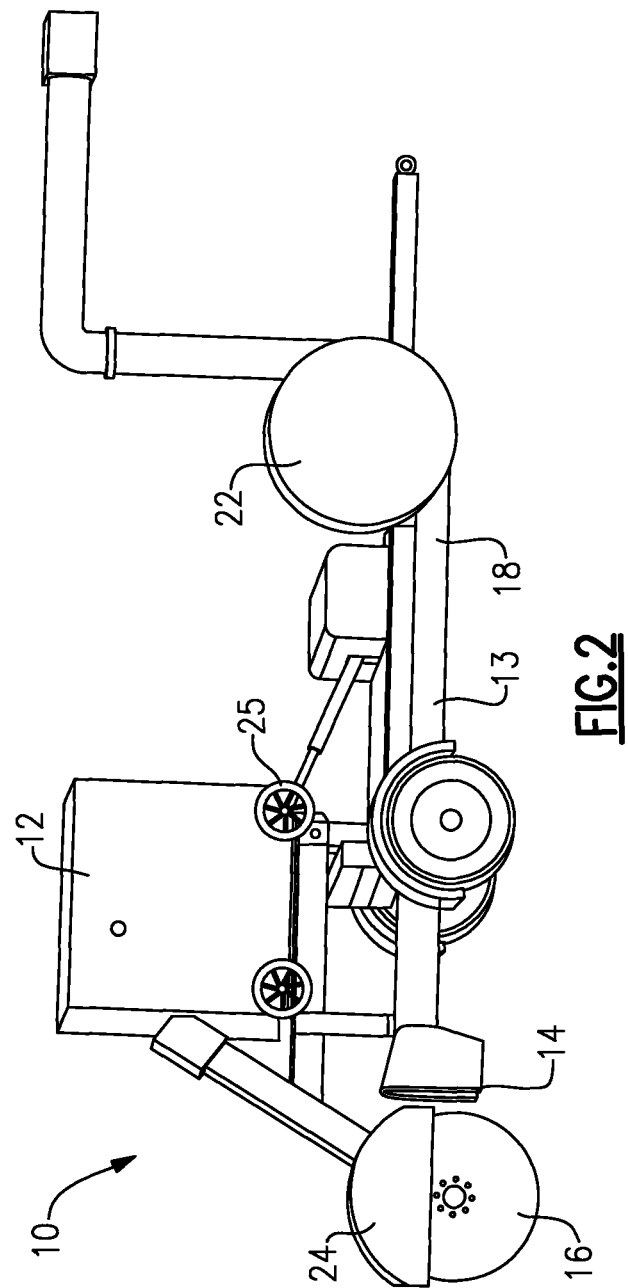
FIGS. 2 and 3 are perspective views of collection systems having differently shaped collectors.

Referring now to the drawings, wherein like reference numerals refer to like parts throughout, there is seen in FIGS. 1 through 6 a chip collection system designated generally by reference numeral 10, for use in connection with a stump grinder 12. Collection system 10 generally comprises a wheeled chassis 13, to which a collector 14 is mounted adjacent the trailing edge of a stump grinding wheel 16. System 10 further includes a duct 18 that leads (i.e., outputs) to a collection bin 20. Collector 14 may be fully enclosed, except for the leading side, or include one or more opening for clearing debris that may have jammed inside. Collector 14 may be rigid or be at least partially formed from a flexible material, such as rubber, particularly where collector 14 meets the ground.

A blower 22 may be mounted within the duct work to create a rearward flow of air to force the chips through the duct 18 (as seen FIGS. 2 and 3), or the force of the chips flying into the duct may produce enough flow to serve this function. Alternatively, exhaust gas from stump grinder 12 may be used to provide a draft to assist in the movement of debris from collector 14 to bin 20 via an exhaust line 21. In addition, blower 22 may be mounted to wheel 16 to provide a draft at the leading edge of duct 18 rather than in an intermediate position along duct 18. Blower 22 may be powered independently of grinder 12 or by the engine used to power grinder 12. In any case, the air draft through duct 18 may be used in combination with a venturi to create a suction point anywhere in the air stream.

It should be recognized by those of skill in the art that duct 18 may comprise an enclosed tube, a conveyor belt, or an auger style duct for transporting debris from the collector to the bin. System 10 may optionally include a separator 23, such as a cyclonic separator to assist is segregating large material from smaller material.

Figure 3:
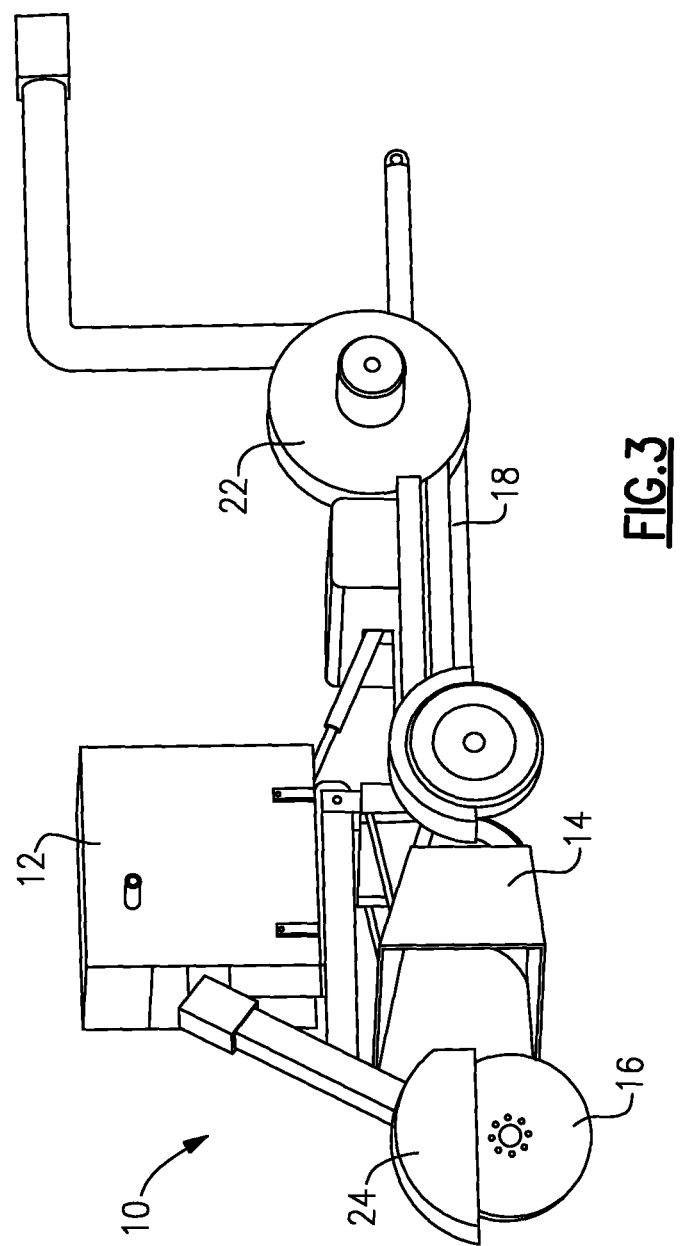
Figure 4:
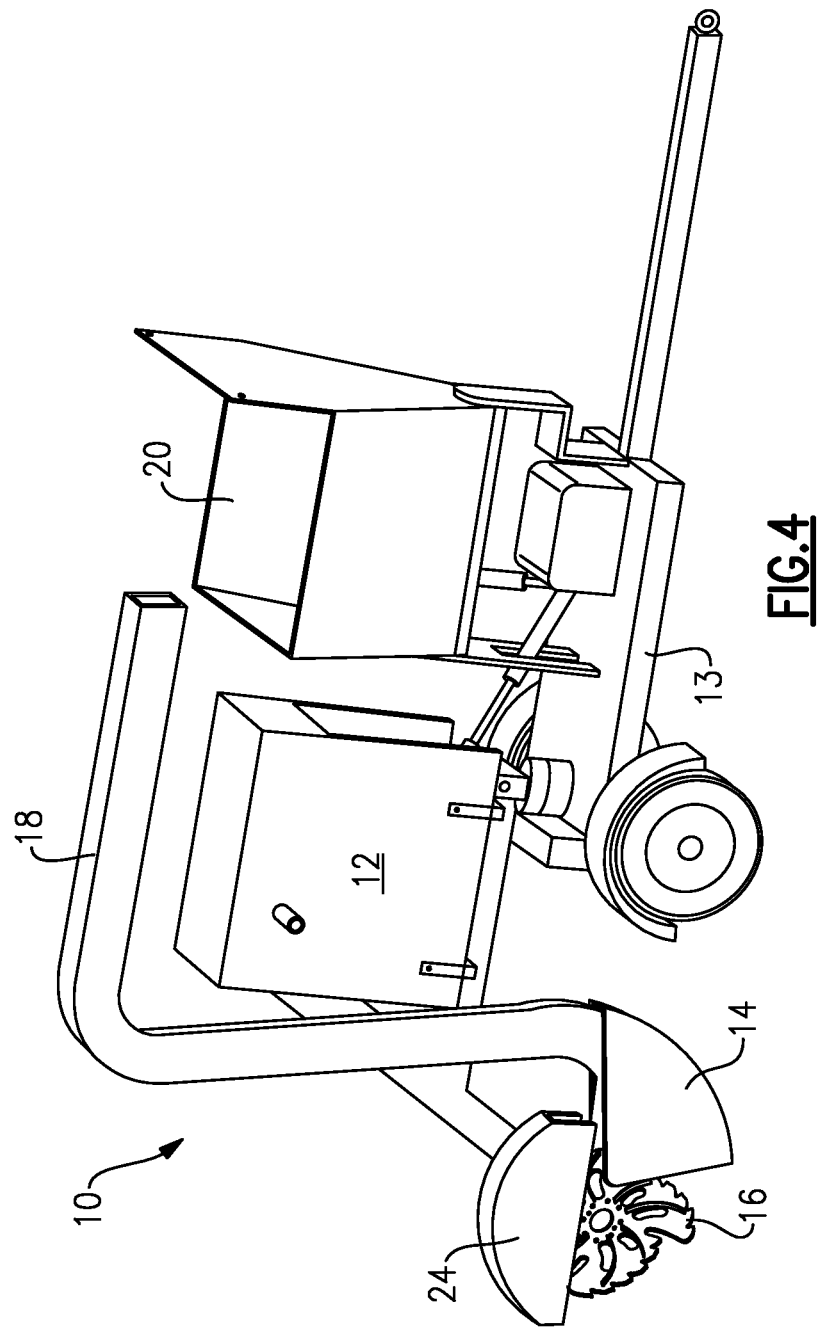
FIGS. 4 and 5 are perspective views of an embodiment of the chip collection system having a pivoting chip collection bin with FIG. 4 showing the bin in a collecting position and FIG. 5 being in a dumping position.
Figure 5:
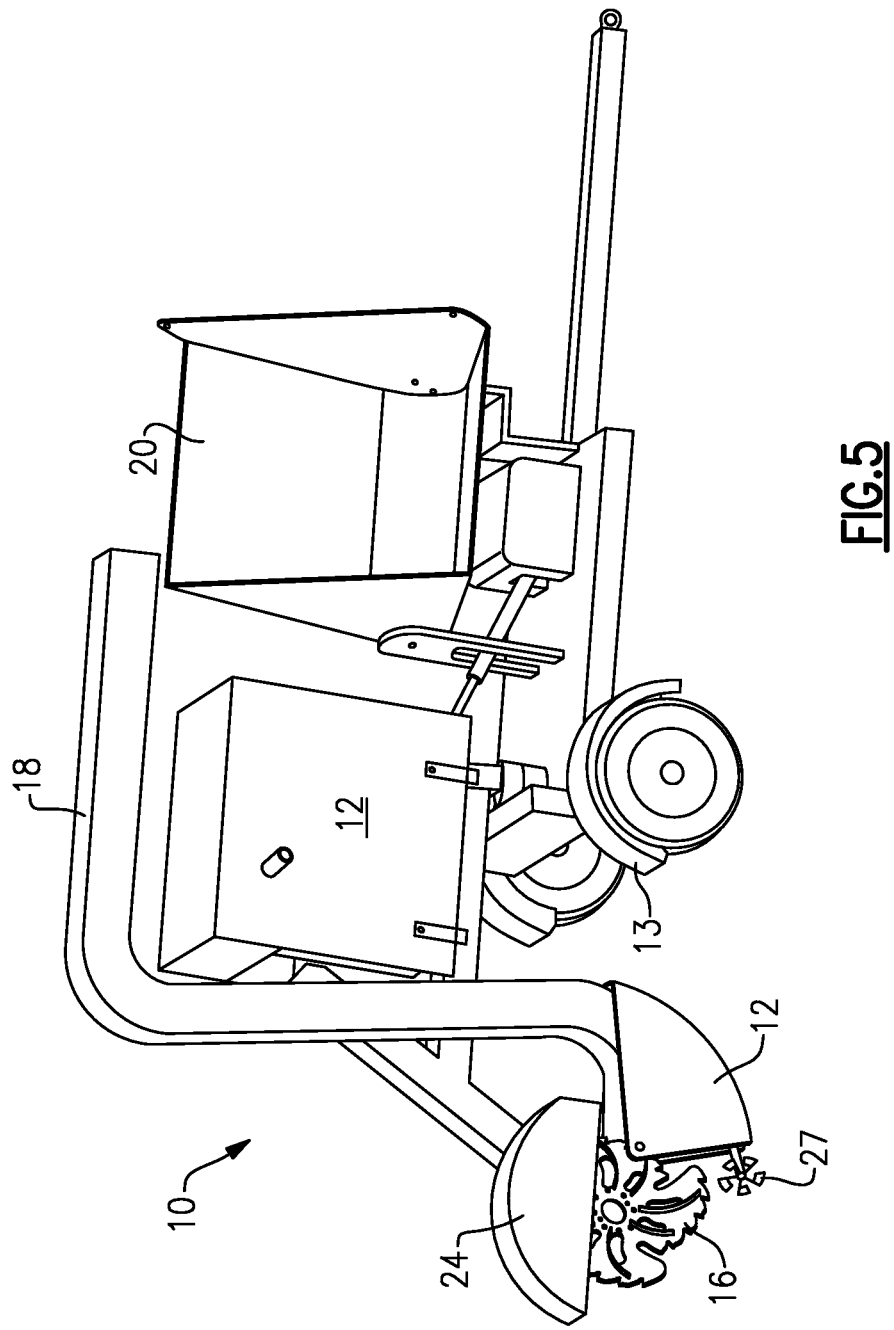

The collector 14 is shaped to receive chips flying off of grinding wheel 16 and, in the embodiment of FIG. 3, is of a larger inlet dimension and is positioned further behind wheel 16 than the collector shown in FIGS. 4 and 5. In the embodiment of FIGS. 4 and 5, the collector 14 straddles the rear of wheel 16 and thus the wheel actually rotates partially within the collector. In this embodiment, when coupled with the wheel guard 24 that is positioned above wheel 16, enough energy is present within the chips that the blower 22 is not needed, although one could always be added to increase the velocity of the chips through duct 18. Collector 14 may include a moveable structure, such as a paddle wheel 27, to help collect chips and other debris case off by wheel 16. System 10 may include a counter-balance on collector 14 to help it collector 14 follow the contour of the ground and create a seal to the ground. It is important for a thorough debris collection process that collector 14 follows and seals to the ground.

Figure 6:
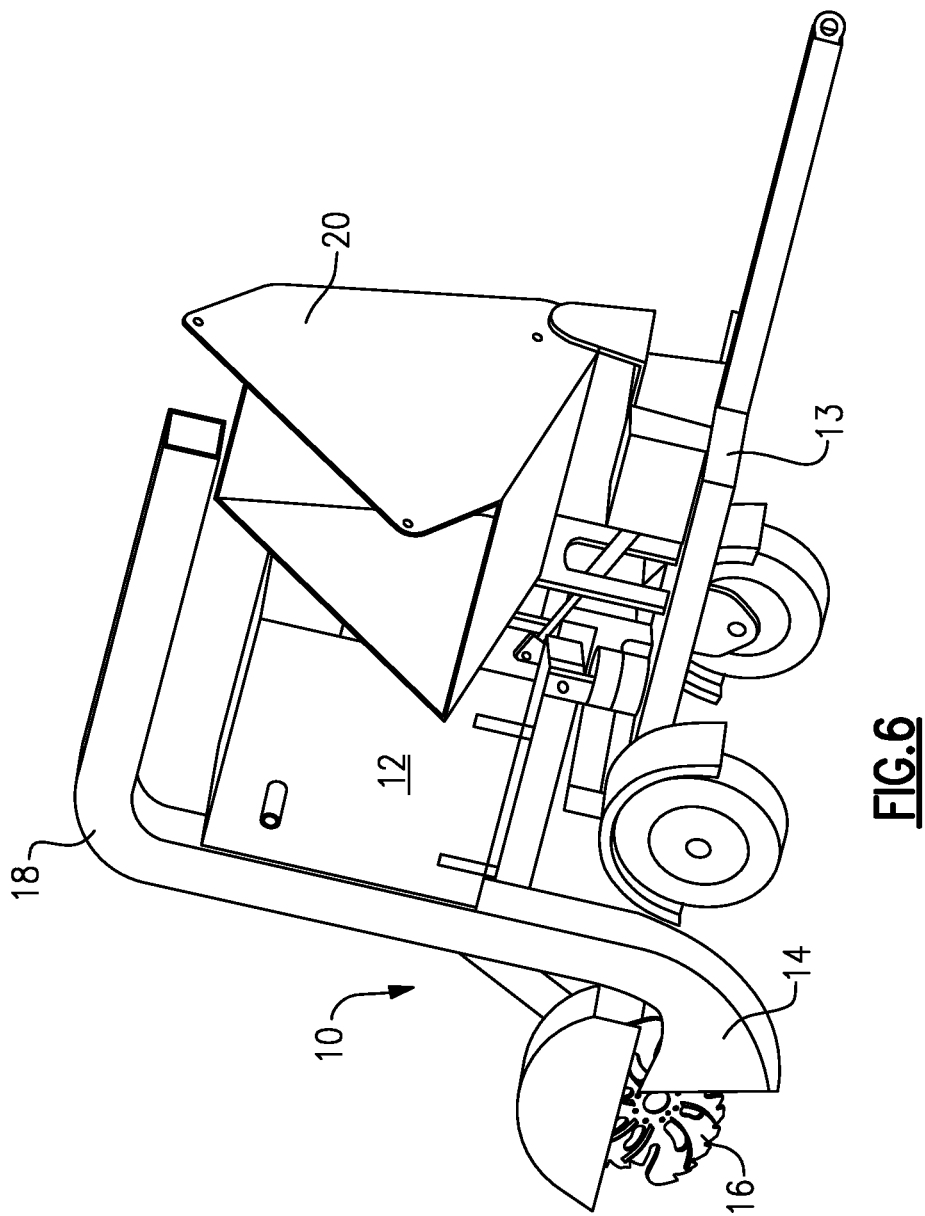
FIG. 6 is a perspective view of the chip collection system with a telescoping duct.

In the embodiment of FIGS. 4 through 6, collection bin 20 is pivotally mounted on chassis 13 such that chips can drop into bin 20 from duct 18 while in operation, and then bin 20 can be pivoted to dump the chips. Bin 20 may be removable from chassis 13 and provided with wheels 25 for ease of transportation.

In the embodiment of FIG. 1, a flexible coupling 26 is inserted within duct 18 to provide flexibility thereto. This permits the duct to be rotated if necessary for depositing the chips into a receptacle in varying locations relative to chassis 13. For example, multiple bins 20 could be used, such as one for soil and one for wood chips. The operator of system 10 could manually or remotely change the position of duct 18 when moving from grinding stumps to chasing roots, which are mostly soil, or even position duct 18 to the side to throw dirt back to the ground.

Figure 7:
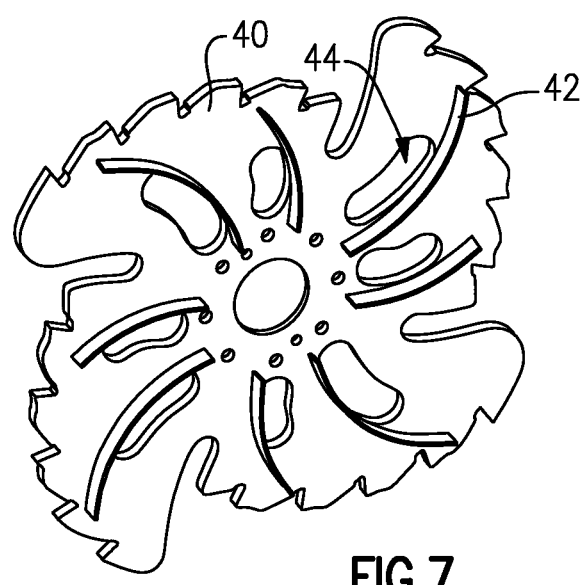
FIG. 7 is a perspective view of a stump grinding wheel with chip vanes.

With reference to FIG. 7, a stump grinding wheel 40 that is designed to assist in the chip collection operation is illustrated. Wheel 40 may optionally includes a series of curved vanes 42 that are positioned adjacent the location of where teeth would be affixed to the wheel such that as soon as a tooth cuts a chip from the stump, the chip is collected by the vane 42, The curved shape of the vanes pushes the chip towards the collector. Opening 44 formed though the wheel adjacent each vane 42 permits the chips to drop through the wheel into a uniform location to make clean-up of the chips easier, in the event wheel 40 is not used with a collection system 10.

Figure 8:
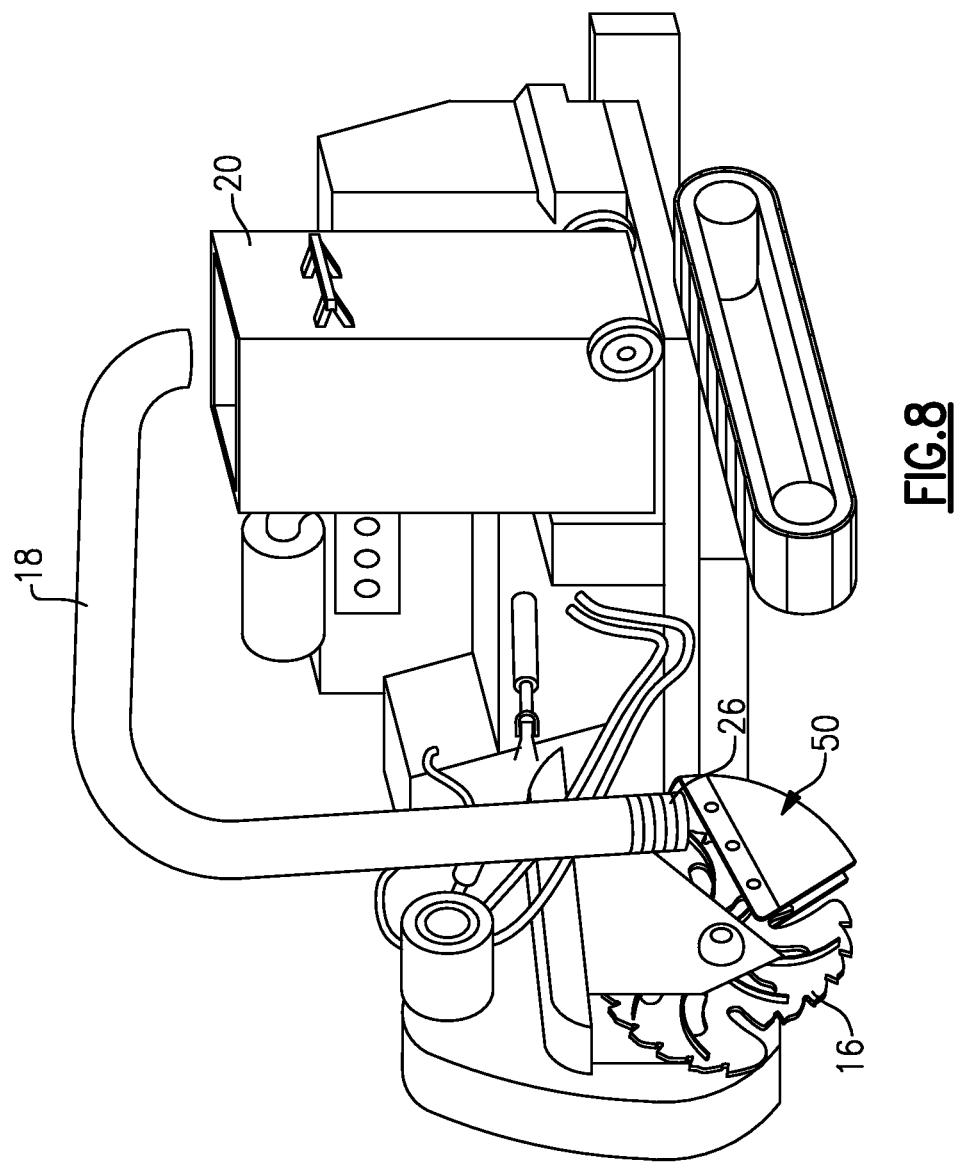
FIG. 8 is another embodiment of the present invention having a removable collection bin with wheels and a direct discharge.

Referring to FIG. 8, an embodiment of the present invention includes a removable collection bin with wheels 25 and a direct discharge into bin 20. Collector 14 includes a rubber or flexible portion 50 for improving the collection of debris. Preferably, portion 50 is positioned to scrape along the ground as system 10 moves along.

Figure 9:
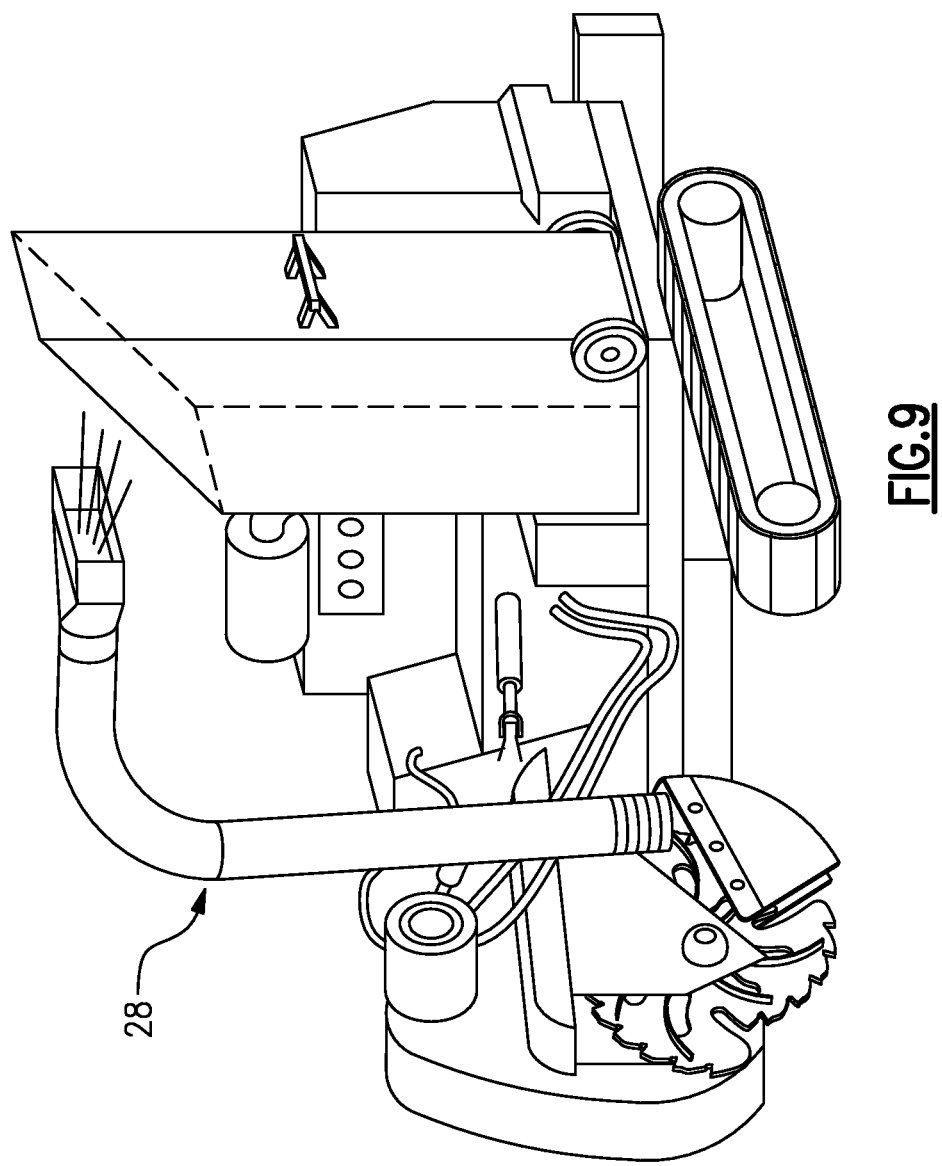
FIG. 9 is an embodiment of the present invention having a three-sided removable collection bin with wheels and indirect discharge.
Figure 10:
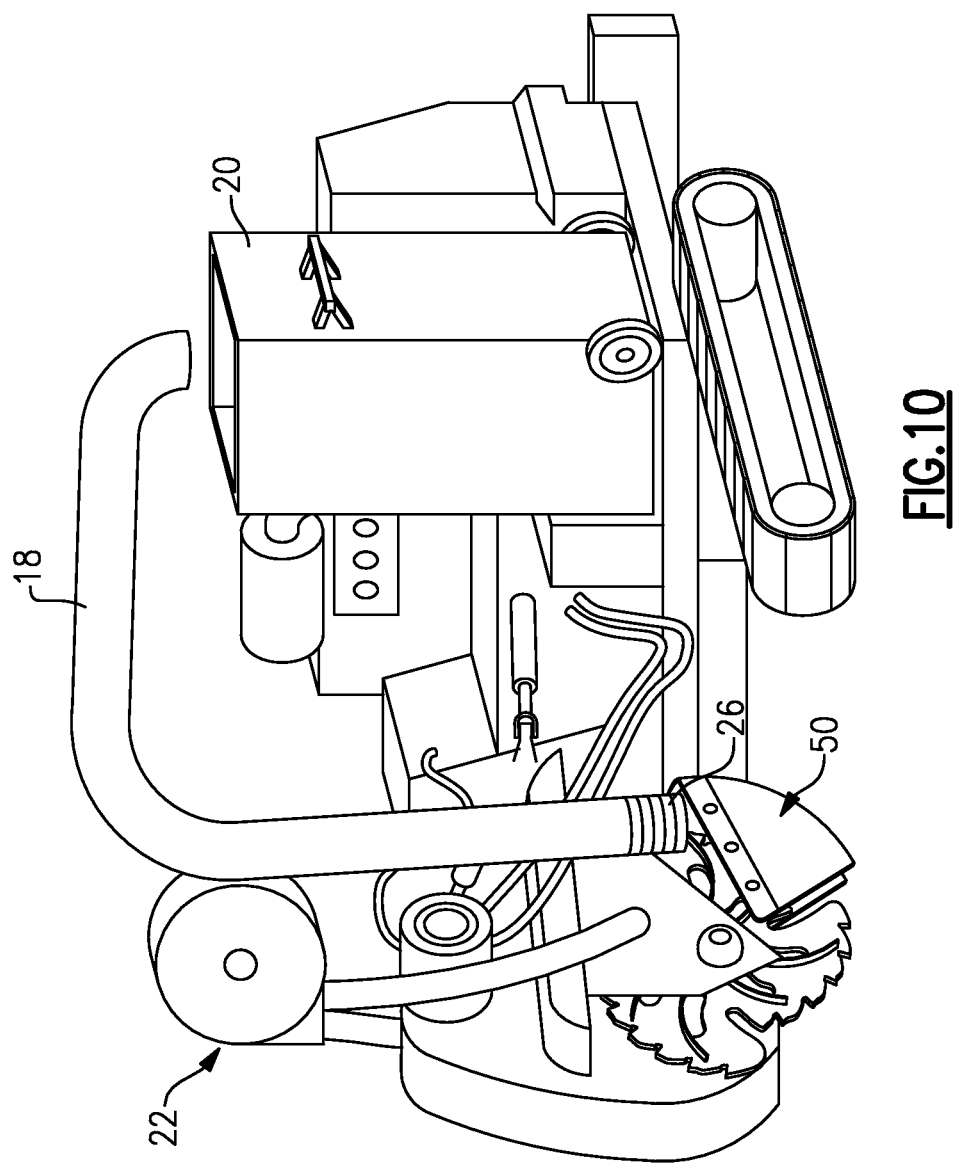
FIG. 10 is an embodiment of the present invention having a blower to blow the chip into the duct and a removable collection bin with wheels with direct discharge into bin.

Referring to FIG. 9, system 10 is shown with a three-sided removable collection bin 20 with wheels and indirect discharge. By comparison, there is seen in FIG. 10 an embodiment of the present invention having blower 22 to blow chips and debris into duct 18 and then in to removable collection bin 20 having wheels 25, with a direct discharge into bin 20.

Figure 11:
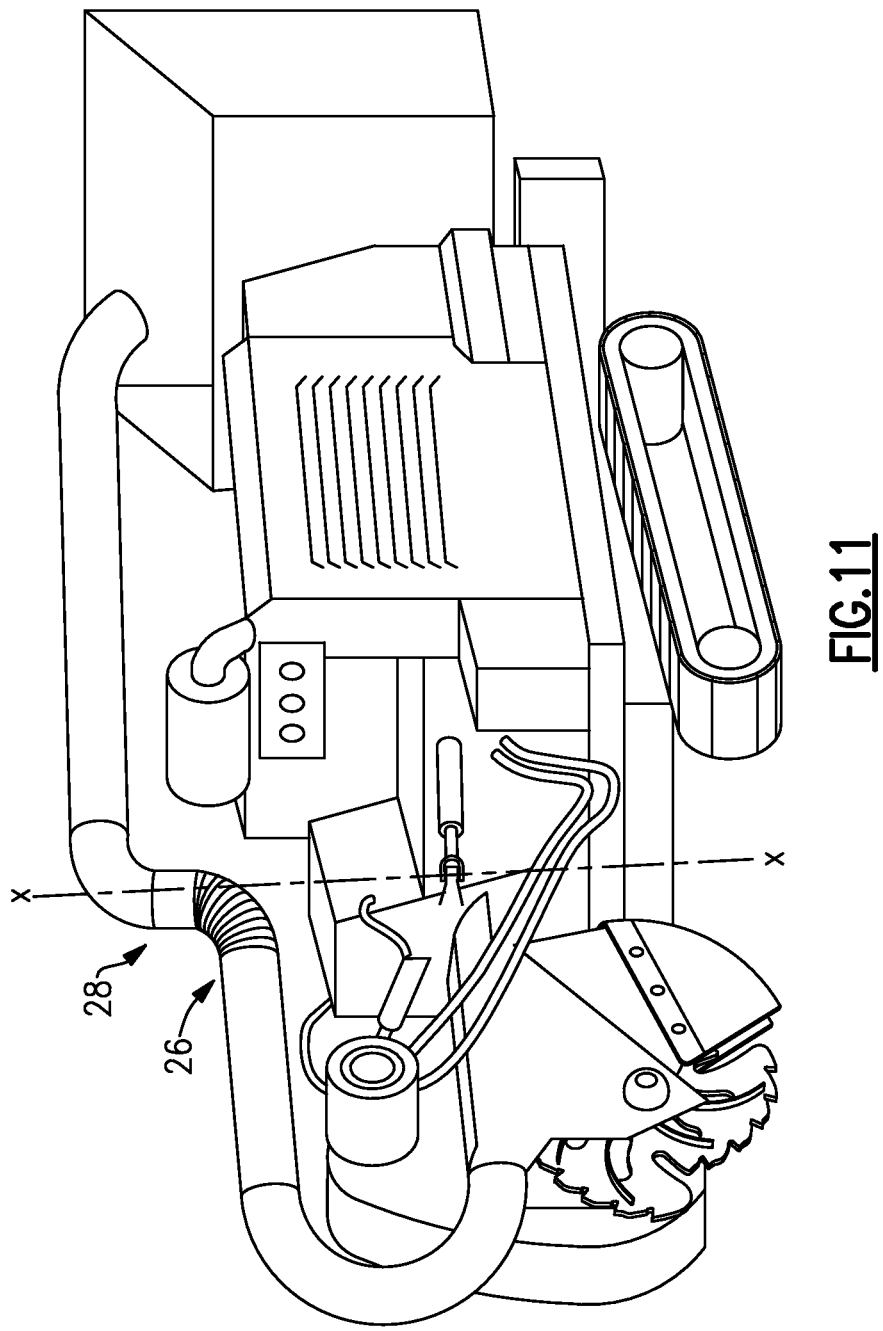
FIG. 11 is an embodiment of the present invention having a swivel joint which can be located over the pivoting axis of the head.
Figure 14:
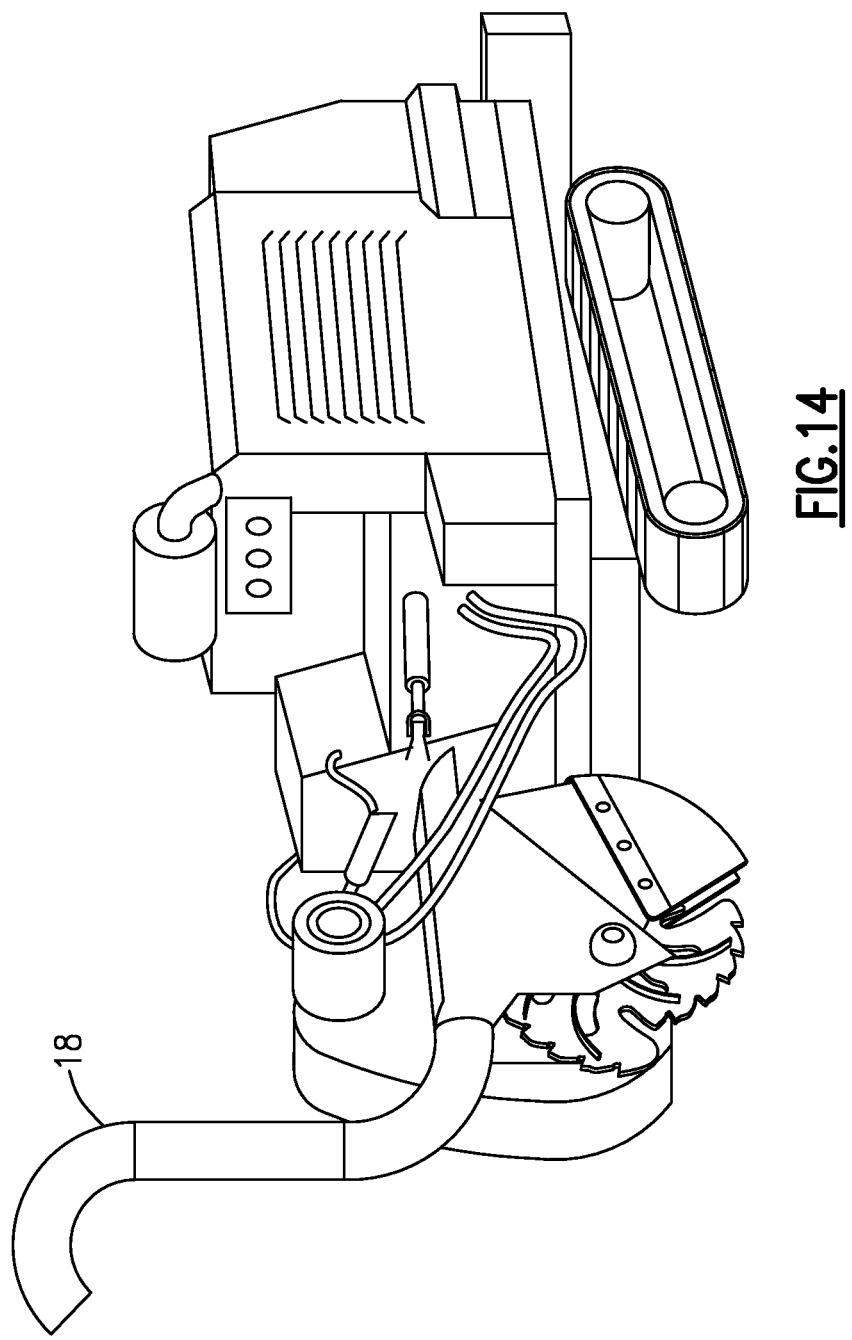
FIG. 14 is an embodiment of the present invention having a front discharge.

Referring to FIG. 11, duct 18 may include flexible coupling 26 and a swivel joint 28, which may be located over the pivoting axis X-X of chassis 13 and stump grinder 12 to allow for easier movement of a combined grinder and chassis configuration. In another embodiment of the present invention, duct 18 of system 10 may be configured to discharge in a forward direction, as seen in FIG. 14 is an embodiment of the present invention having a front discharge.

Figure 12:
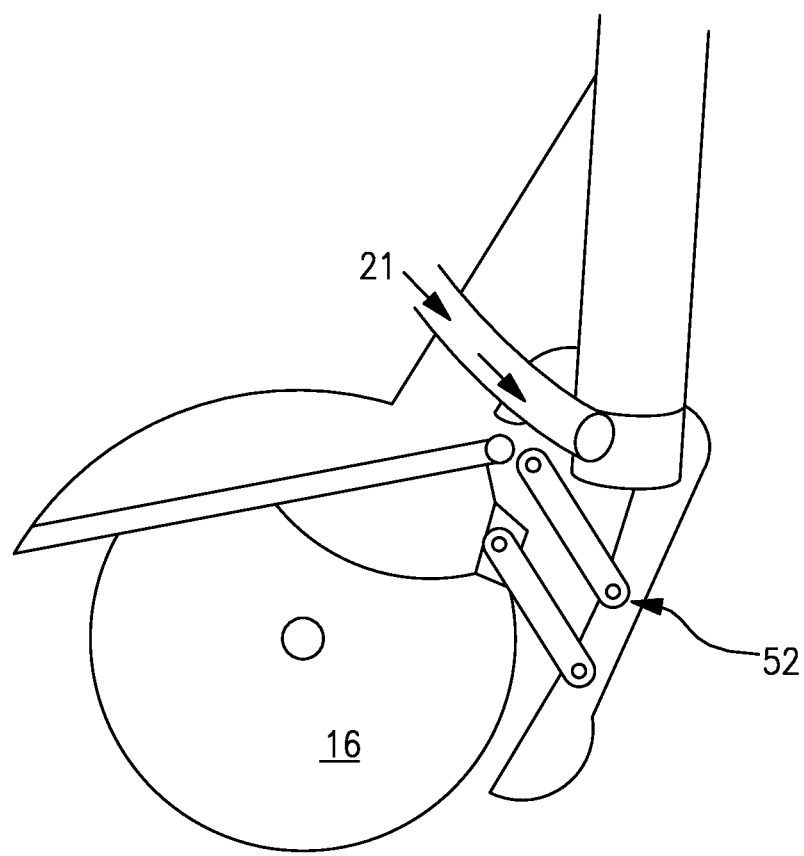
FIG. 12 is an embodiment of the present invention having parallel linkage for retraction.
Figure 13:
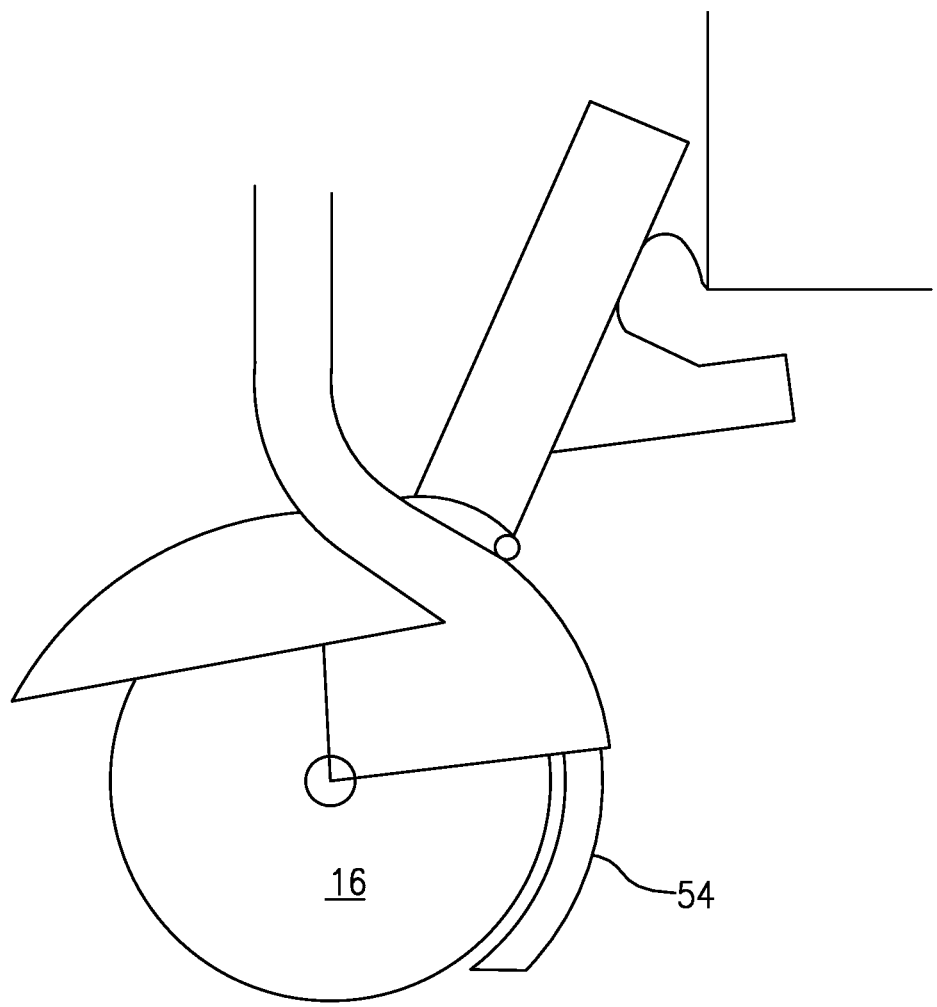
FIG. 13 is an embodiment of the present invention having a circularly retracting collector.
Figure 15:
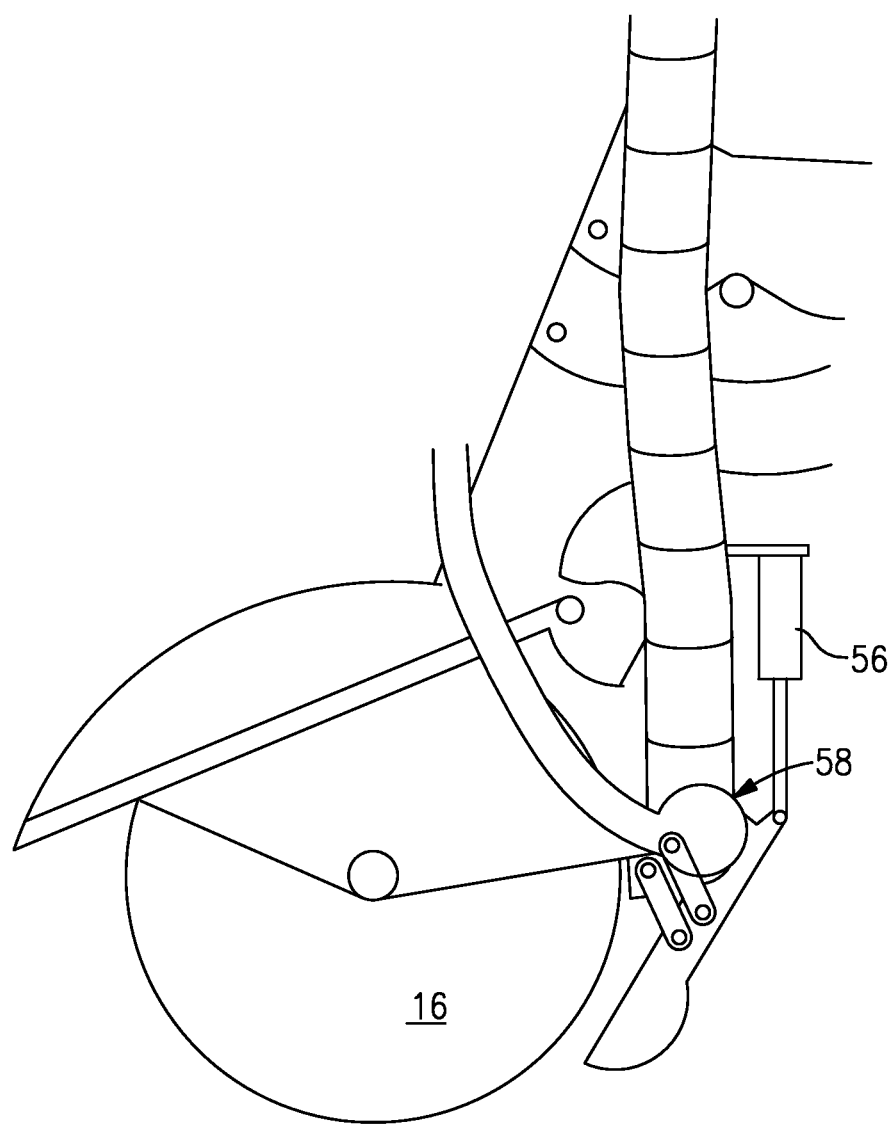
FIG. 15 is an embodiment of the present invention having a floating and retractable cylinder.

To assist with the movement of collector 14 into optimal debris collecting position, system 10 may include a parallel linkage 52 for retracting and extending collector 14, as seen in FIG. 12. As further seen in FIG. 12, exhaust line 21 may be provided proximate to collector 20 to assist in the movement of debris into and through duct 18. As seen in FIG. 15, a retraction cylinder 56 may be used to move collector 14. Duct 18 may include a venturi 58 to generate suction. Referring to FIG. 13, collector 14 of system 10 may include a semi-circular guard 54 that may be extended and retracted into and out of a debris collecting position. Guard 54 is preferable shaped in a curve substantially approximating that of grinding wheel 16 to assist in the collection of chips and debris.

What is claimed is:

1. A stump grinding machine comprising:
   a chassis comprising a wheel-driving hardware set and a stump grinding wheel attachment hardware set, with the chassis defining a forward direction, a rearward direction, an up direction, a down direction, a first side direction and a second side direction that is opposite said first side direction;
   a stump grinding wheel sub-assembly, comprising a stump grinding wheel member, with the stump grinding wheel member defining a central axis, an axial direction, an angular direction and a radial direction;
   a stump grinding wheel; and
   a wood chip collection sub-assembly comprising a collector member and a wood chip receptacle sub-assembly;
   wherein:
   the stump grinding wheel attachment hardware set rotatably mechanically connects the stump grinding wheel sub-assembly to the chassis so that: (a) the central axis of the stump grinding wheel is: (i) at least substantially aligned with the two opposing side directions, (ii) perpendicular to the up and down directions and (iii) also perpendicular to the forward and rearward directions, (b) the wheel-driving hardware set is operatively connected to the stump grinding wheel sub-assembly such that the wheel-driving hardware set drives the stump grinding wheel sub-assembly to rotate about the central axis of the stump grinding wheel, and (c) the grinding wheel is located sufficiently low to the ground to grind stumps that are embedded in the ground;
   the stump grinding wheel comprises a first major surface facing in the first side direction, a second major surface, facing in the second side direction and a peripheral edge facing in the radial direction;
   the wood collection chip sub-assembly is mechanically connected to the chassis and is sized, shaped, structured and/or located to guide material, cut by rotation of the stump grinding wheel sub-assembly into the wood chip receptacle sub-assembly; and
   the collector member is shaped, sized, located, structured and/or connected so that it surrounds at least a portion of the peripheral edge of the stump grinding wheel that is: (i) located rearwards of the central axis, and (ii) located below the central axis in the down direction, and is further shaped, sized, located, structured and/or connected so that it surrounds at least a portion of the first major surface of the stump grinding wheel that is: (i) located rearwards of the central axis, and (ii) located below the central axis in the down direction.

2. The stump grinding machine of claim 1 wherein:
   the collector member is retractable between an extended position and a retracted position; and
   in at least the extended position, the collector member is shaped, sized, located, structured and/or connected so that it surrounds at least a portion of the peripheral edge of stump grinding wheel that is: (i) located rearwards of the central axis, and (ii) located below the central axis in the down direction.

3. The stump grinding machine of claim 1 wherein the collector member is further shaped, sized, located, structured and/or connected so that it surrounds at least a portion of the second major surface of the stump grinding wheel that is: (i) located rearwards of the central axis, and (ii) located below the central axis in the down direction.

4. The stump grinding machine of claim 1 wherein:
the collector member is substantially comprised of a flexible material; and
the wood chip collector member is further shaped, sized, located, structured and/or connected so that it scrapes along the ground as the stump grinding system travels in the forward direction, the first side direction and/or the second side direction.

5. The stump grinding machine of claim 4 wherein the flexible material is rubber.

6. The stump grinding machine of claim 1 wherein the wood chip collector member is further shaped, sized, located, structured and/or connected so that it follows and seals to the ground as the stump grinding system travels in the forward direction, the first side direction and/or the second side direction.

7. A stump grinding machine comprising:
a chassis comprising a wheel-driving hardware set and a stump grinding wheel attachment hardware set, with the chassis defining a forward direction, a rearward direction, an up direction, a down direction, a first side direction and a second side direction that is opposite said first side direction;
a stump grinding wheel sub-assembly, comprising a stump grinding wheel member, with the stump grinding wheel member defining a central axis, an axial direction, an angular direction and a radial direction;
a stump grinding wheel; and
a wood chip collection sub-assembly comprising a collector member and a wood chip receptacle sub-assembly;

wherein:
the stump grinding wheel attachment hardware set rotatably mechanically connects the stump grinding wheel sub-assembly to the chassis so that: (a) the central axis of the stump grinding wheel is: (i) at least substantially aligned with the two opposing side directions, (ii) perpendicular to the UP and down directions and (iii) also perpendicular to the forward and rearward directions, (b) the wheel-driving hardware set is operatively connected to the stump grinding wheel sub-assembly such that the wheel-driving hardware set drives the stump grinding wheel sub-assembly to rotate about the central axis of the stump grinding wheel, and (c) the grinding wheel is located sufficiently low to the ground to grind stumps that are embedded in the ground;
the stump grinding wheel comprises a first major surface facing in the first side direction, a second major surface, facing in the second side direction and a peripheral edge facing in the radial direction;
the wood collection chip sub-assembly is mechanically connected to the chassis and is sized, shaped, structured and/or located to guide material, cut by rotation of the stump grinding wheel sub-assembly into the wood chip receptacle sub-assembly; and
the collector member is shaped, sized, located, structured and/or connected so that it surrounds at least a portion of the peripheral edge of the stump grinding wheel that is: (i) located rearwards of the central axis, and (ii) located below the central axis in the down direction
wherein:
the wood chip collection sub-assembly further comprises a counter-balance sub-sub-assembly; and
the counter-balance sub-sub-assembly shaped, sized, located, structured and/or connected so that the wood chip collector member follows and seals to the ground as the stump grinding system travels in the forward direction, the first side direction and/or the second side direction.

* * * * *